United States Patent Office 3,352,783
Patented Nov. 14, 1967

3,352,783
HYDRAULIC FLUID
Robert S. McCord, Pacific Palisades, Calif., assignor, by mesne assignments, to McDonnell Douglas Corporation, Santa Monica, Calif., a corporation of Maryland
No Drawing. Filed Dec. 30, 1963, Ser. No. 334,588
8 Claims. (Cl. 252—78)

This invention relates to a fluid composition, useful particularly for transmitting power in hydraulic power systems, and is especially concerned with a non-flammable hydraulic fluid useful in the hydraulic systems including pumps of aircraft, and particularly of high-speed supersonic aircraft.

A number of fluids are known which are intended for use to transmit power in hydraulic systems including some known fluids intended for use in the hydraulic systems of airplanes. However, the hydraulic power systems of aircraft for operating various mechanisms of an airplane impose stringent requirements on the hydraulic fluid used. Not only must the hydraulic fluid for aircraft meet stringent functional and use requirements, but, in addition, such fluid should be as highly non-flammable as possible, and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature, and a low rate of change of viscosity with temperature. Its pour point should be low. Its volatility should be low at elevated temperatures of use, and the volatility should be balanced; that is, selective evaporation or volatilization of any important component should not take place at the high temperatures of use. It must possess sufficient lubricity and mechanical stability to enable it to be used in the self-lubricated pumps, valves, etc. employed in the hydraulic systems of aircraft which are exceedingly severe on the fluid used. It should be chemically stable to resist such chemical reactions as oxidation, decomposition, etc., so that it will remain stable under conditions of use against loss of desired characteristics due to high and sudden changes of pressure, temperature, high shearing stresses, and contact with various metals which may be, for example, aluminum, bronze, etc. It should also not deteriorate the gaskets or packings of the hydraulic system. It must not adversely affect the materials of which the system is constructed, and in the event of a leak should not adversely affect the various parts of the airplane with which it may accidentally come in contact. It should not be toxic or harmful to personnel who may come in contact with it.

Pumps employed in aircraft may be of various types, including the piston-type pump, more particularly the variable-stroke piston pump, the variable-discharge or variable-displacement piston pump, radial-piston pump, axial-piston pump, in which a pivoted cylinder block is adjusted at various angles with the piston assembly, for example, the Vickers axial-piston pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves.

Good lubricating properties are especially important. These particularly include lubricity and film strength. Good lubricity and film strength lessen wear of moving parts in pumps and valves where the clearance between frictional surfaces may be so small that only microscopically thin films of lubricant are possible. Pressures between some of the moving parts may be very high. To avoid excessive wear or seizure, especially in the case of high fluid pressure, the hydraulic fluid should provide a strong lubricating film which will resist the pressure and wiping action between the moving parts at the temperatures of operation.

Even more stringent requirements are placed on hydraulic fluids for use in supersonic aircraft, particularly for operation of the pumps thereof. The hydraulic fluid used in such pumps and systems should have good lubricity, and should have fire resistance equal to that of present commercially available fire-resistant hydraulic fluids, yet be operable up to 550° to 600° F., at which elevated temperatures the present hydraulic fluids are not operable. Most presently available hydraulic fluids are limited to operation at temperatures not above about 350° F. due to decomposition of such materials to form solids which plug up lines and filters. Also, hydraulic fluids used in modern aircraft should be operable at a low temperature, e.g., down to −40° F. to about −65° F. Hence, viscosity must be relatively low at low temperatures, and, in any event, the viscosity of the hydraulic fluid should be under about 14,000 centistokes at all operating temperatures. At high temperature, it is desirable that the fluid does not thin out but retains sufficient lubricity for the particular pump.

It is accordingly an object of the invention to provide an improved hydraulic fluid having good lubricity to effectively lubricate the moving parts of a pump or system, satisfactory viscosity at low, as well as high, temperatures at which the aircraft must operate, low rate of change of viscosity with temperature, and particularly high viscosity index.

Further, hydraulic fluids for use in modern supersonic aircraft should have a specific gravity as low as possible, preferably approaching or below 1, in order to keep the weight and viscosity effects of the fluid at a minimum. Further, vapor pressure should be low, and the boiling point of the fluid should be higher than the highest operating temperature, which is of the order of about 550° F. The hydraulic fluid should be non-flammable, and should have an auto-ignition temperature substantially above that of the maximum operating temperature of the aircraft, namely: above about 550° F. Also, the thermal stability of the hydraulic fluid between the operating temperatures of from about −65° up to about 550° F. should be such that essentially no separation of solids or the formation of viscous tar-like materials or highly acidic decomposition products are produced. Hydraulic fluids containing organic phosphates and phosphonates are known. However, none of these fluids having the required viscosity characteristics also possess the necessary thermal stability properties to permit employment of such fluids in the high temperature range of operation of 400 to 550° F. Hence, it is a further object of the invention to provide a hydraulic fluid having the aforementioned characteristics, particularly the viscosity, thermal stability and fire resistance required for operation in the above-noted temperature range.

Yet another object of the invention is to afford a hydraulic fluid having stability under conditions of use against loss of the desired characteristics due to high and sudden changes of pressure, temperature, high shearing stresses, and having minimum corrosiveness to metal parts, e.g., aluminum and titanium, and the property of not deteriorating gaskets or packings, and particularly be highly non-flammable or fire-resistant.

Other objects and advantages of the invention will be apparent or be obvious from the following description of the invention.

In accordance with the invention, it has now been found that improved hydraulic fluids particularly designed for use in high-speed supersonic aircraft and effective at temperatures of the order of 550° F. are provided by a composition comprising a major portion of an aryl dialkyl phosphinate and a minor portion of a suitable thickener of the nature described more fully hereinafter.

The monoaryl dialkyl phosphinates suitable for the purposes of the invention have the following general formula:

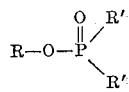

where R is aryl, e.g., phenyl or naphthyl, and R' is an alkyl group of from 4 to 8 carbon atoms, preferably an alkyl group of from 4 to 6 carbon atoms. Thus, the alkyl groups can be butyl, pentyl, hexyl, heptyl and octyl. Also, branched chain alkyl groups can be employed. In this respect, aryl dialkyl phosphinates can be employed wherein the alkyl groups are secondary and tertiary butyl, neopentyl, branched chain hexyls and heptyls, and also branched chain octyl groups, such as isooctyl. The two alkyl groups in the phosphinates may be the same or different alkyls.

It is generally preferred to employ aryl dialkyl phosphinates according to the invention wherein the alkyl groups are straight-chain alkyls. However, two important exceptions are neopentyl and 2-ethyl hexyl, which are also preferred alkyls because of the higher stability of the resulting phosphinate derivatives.

The monoaryl dialkyl phosphinates employed in the invention composition can be produced by well known techniques of esterfication from symmetric phosphonic acids prepared as described in the Journal of American Chemical Society, vol. 71, pages 369 and 370, January 1949, titled "A Synthesis of Symmetric Phosphinic Acids," by G. M. Kosolapoff, or from the halide $R_2'P(O)Cl$, described on page 61 of "Organophosphorus Compounds" by G. M. Kosolapoff, John Wiley & Sons, June 1958, second printing, where R' is an alkyl group, e.g., as defined above. In such process of manufacture, the final reaction product contains, in addition to the desired aryl dialkyl phosphinate, small amounts of other side reaction products, including phosphonates and phosphine oxides. Thus, for example, in the preparation of phenyl di-n-butyl phosphinate for use in hydraulic fluids, according to the invention, by practice of the above process a mixture of products is formed composed of about 70% to 80% of the phenyl di-n-butyl phosphinate, about 10% to about 15% of diphenyl-n-butane phosphonate, and about 10% to about 15% of tri-n-butyl phosphine oxide. This impure material itself is substantially as suitable as the purified aryl dialkyl phosphinate. To obtain a purer material, the above mixture may be distilled to increase the amount of phosphinate and reduce the amounts of the above-noted side-reaction products. Thus, the above-described mixture may be distilled to obtain a composition composed of about 87% of the phenyl di-n-butyl phosphinate, about 7% diphenyl-n-butane phosphonate, and about 6% tri-n-butyl phosphine oxide, and such composition can be further distilled, if desired, to obtain a material having a still higher percentage of phenyl di-n-butyl phosphinate. Hence, the term "aryl dialkyl phosphinate" employed herein and in the claims is intended to denote either the pure compound or an impure mixture containing a major proportion of aryl dialkyl phosphinate, and in which the minor amounts of other materials do not adversely affect the properties of the aryl dialkyl phosphinate for effectiveness in the hydraulic fluids, according to the invention.

If desired, a single one of the above defined phosphinates can be employed in compounding a hydraulic fluid according to the invention, or a mixture of such phosphinates can be employed. The preferred aryl dialkyl phosphinate for purposes of the invention is phenyl di-n-butyl phosphinate particularly since its viscosity at low temperatures of the order of —40° F. is lower than the viscosity of the other aryl dialkyl phosphinates defined above at such low temperatures.

It will be noted that both alkyl groups R' of the above-defined aryl dialkyl phosphinates are directly attached to the phosphorus atom. This structure is particularly significant in providing a highly stable and fire-resistant phosphinate ester which is particularly suitable for use as a major component of a hydraulic fluid designed for use at high temperatures up to about 550° F., according to the invention.

The aryl dialkyl phosphinates of the invention composition are not suitable alone as hydraulic fluids, particularly at the above-noted high temperatures of operation of the order of 550° F. encountered in modern supersonic aircraft operations. Such aryl dialkyl phosphinates have too low a viscosity at such high temperatures for aircraft systems use. Thus, it is not possible to obtain suitable pump life with the aryl dialkyl phosphinates employed alone as hydraulic fluid. For example, using such phosphinates alone, it has been found from experience that some pumps have a useful life of only about five hours. Accordingly, a minor amount of a thickener or thickening agent must be employed in conjunction with the aryl dialkyl phosphinates in order to provide an operable hydraulic fluid for the intended purpose. The properties required of such a thickener are very severe. Thus, the thickener must be, first of all, soluble in the base phosphinate stock. Secondly, the thickener should provide thickening ability such as to afford proper viscosity of the hydraulic fluid at temperatures of the order of 400° to 550° F. It is particularly important that the thickener provide a minimum increase in viscosity at low temperature, and as high a viscosity index as possible. Hence, although it is desirable to obtain a viscosity index for the hydraulic fluid of the invention of the order of 200 or above, the use of thickeners which provide a phosphinate-containing hydraulic fluid having a viscosity index of at least 75, e.g., in the range of about 75 to 150, as provided by the thickeners employed herein, has been found satisfactory. Hence, the thickener should provide a viscosity index improvement over the base aryl dialkyl phosphinate stock. For this purpose, the thickener should have borderline solubility in the phosphinate base. At low temperatures down to at least —40° F., the viscosity of the fluid containing the thickener should not be in excess of about 14,000 centistokes. Further, the thickener which is usually, although not necessarily, liquid, should have low volatility, and when incorporated in the phosphinate, should provide a fluid having a low pour point for operability at the low temperatures. The thickener should also have high effectivity in terms of high viscosity increase of the composition per unit of thickener additive, that is, only a small amount of thickener is required for incorporation into the base phosphinate stock. Of particular significance, the thickener must have high thermal stability at temperatures of at least 400° F., preferably up to about 550° F., and should reduce the ease of ignition of sprays of the hydraulic fluid into a flame.

While there are a number of various types of thickeners which meet many of the above-noted requirements, it has been found that there are relatively few thickeners which can meet the latter-mentioned requirements of high thermal stability, together with providing resistance of the hydraulic fluid against ignition of the fluid when broken up into droplets and sprays, as by malfunctioning of the hydraulic system at the high temperatures of operation noted above, i.e., in the range of about 400° to about 550° F.

It has been found that thickeners useful in the invention compositions are the polyalkyl methacrylates, the polyalkylene glycols, the polyurethanes, and the methyl phenyl silicone polymers, in the order of preference named. These thickeners possess substantially all or most of the desired properties of a thickener for an aryl dialkyl phosphinate base stock for providing hydraulic fluids which are particularly effective at the above-noted high operating temperatures of the order of 550° F. and at the low operating temperatures of between —40° and —65° F. The polyalkyl methacrylate and polyalkylene glycol thickeners particularly have high thermal stability, and the latter in addition, upon any decomposition thereof, do not form solid decomposition products. Since all of the above specified thickeners have a relatively high percentage of hydrogen, it would be expected that when such thickeners are incorporated into an aryl dialkyl phosphinate base material, according to the invention, a more flammable composition would result. On the contrary, it has been unexpectedly discovered that the incorporation of such thickeners into the phosphinate renders the resulting hydraulic fluid or mixture less flammable than the aryl dialkyl phosphinate base stock alone. Hence, the incorporation of the above-noted thickeners into the phosphinate reduces the ease of ignition of sprays of the hydraulic fluid in contact with a flame and enhances rather than degrades the fire resistance of the resulting composition, and provides a highly fire-resistant hydraulic fluid, a particularly important property and advantage of such hydraulic fluids for use in modern high-speed aircraft.

The polyalkyl methacrylates suitable for the purpose of the invention are generally those resulting from the polymerization of alkyl methacrylates in which the alkyl groups can have an average of from about 3 to 10 carbon atoms. The alkyl groups may be mixtures such as derived from a mixture of alcohols, and in which case there may be included some alkyl groups having as low as two carbon atoms and as high as about 12 carbon atoms. The number of carbon atoms in the alkyl group should be such that the polymer is compatible with the particular phosphinate used, with respect to thickening efficiency and the borderline solubility necessary for improving viscosity index. Preferably the alkyl groups of the methacrylate can vary from about 4 to about 8 carbon atoms. Usually the lower the alkyl group of the phosphinate, the lower should be the alkyl group of the methacrylate. The poly-n-butyl methacrylate is preferred for use with the preferred phosphinate material of the invention, i.e., phenyl dibutyl phosphinate. The average molecular weight of the polyalkyl methacrylate can range from about 7,000 to about 12,000. However, polyalkyl methacrylates having molecular weights outside the above ranges may be suitable when used with a particular aryl dialkyl phosphinate, according to the invention.

In compounding the compositions of the invention, the alkyl methacrylate polymer may be added to the phosphinate, or mixture of phosphinates, using the methacrylate polymer per se or the methacrylate polymer in a carrier therefor.

If desired, the alkyl methacrylate monomer may be polymerized in situ in the phosphinate or mixture of phosphinates by adding the unpolymerized alkyl methacrylate ester thereto and then polymerizing the monomer to the desired degree.

The polyalkyl methacrylate thickener described above is the most desirable one for purposes of the invention. The main reasons for this preference are the high thermal stability of the polyalkyl methacrylate, the high fire resistance of the resulting hydraulic fluid, and particularly the high effectiveness of the polyalkyl methacrylate in terms of high viscosity increase of the composition per unit of such additive.

Another suitable thickener for purposes of the invention are the high molecular weight polyalkylene glycols. Suitable materials of this type are those in which the alkylene groups contain from 2 to 3 carbon atoms. Thus, specific examples of such polyalkylene glycols are the high molecular weight polypropylene glycols, polyisopropylene glycols, and copolymers such as the ethylene glycol, isopropylene glycol copolymer. Such high molecular weight polyalkylene glycols are characterized by having a range of viscosity of about 1,400 to about 23,000 centistokes at 100° F. Such polyalkylene glycol thickeners have the particular advantage that when incorporated in an aryl dialkyl phosphinate of the invention, they provide a relatively high viscosity index for the resulting fluid of the order of about 150. However, at low operating temperatures of the order of about —40° F., some of the hydraulic fluids containing such polyalkylene glycols according to the invention tend to become clouded, but this does not adversely affect the functional properties of the hydraulic fluid.

Also suitable as thickeners for incorporation in the hydraulic fluids of the invention are the urethane polymer liquids. These may be urethane polyether or urethane polyester materials. While this class of thickeners also confers a high viscosity index upon hydraulic fluids containing phosphinates, according to the invention, it is not as desirable for use as the above-noted polyalkyl methacrylate and polyalkylene glycol additives, due mostly to a tendency toward thermal instability at high temperatures approaching 550° F. Also, hydraulic fluids containing such polyurethane liquids according to the invention are relatively viscous, although operable at low temperatures of the order of about —40° F.

Another thickener which can be added to the aryl dialkyl phosphinate for purposes of the invention are the liquid methyl phenyl silicone polymers preferably of high molecular weight, and characterized by having a viscosity, e.g., in the range of about 450 to about 575 centistokes at 100° F. The polymers of this type most useful in the hydraulic fluids hereof are those having a high phenyl to methyl ratio, e.g., of at least about 1:1, and which may be about 2:1, or higher, thus having high thermal stability yet being in liquid form. These polymers are operable at temperatures in the range of 400° to 550° F., and have the further advantage, when employed with the phenyl di-n-butyl phosphinate, of reducing metal corrosion, acid buildup, and thickening and darkening of the hydraulic fluid. Other advantages of such liquid silicone polymers are their small change of viscosity with temperature, especially over a wide range of temperature, high chemical stability even at the above-noted high temperature range, chemical inertness, low pour point, resistance to shear breakdown, and resistance to combustion.

Usually a minor proportion, and generally from about 0.5% to about 10% by weight of the thickener, based on the weight of the total composition, produces the desired effectiveness in the aryl dialkyl phosphinate base stocks of the invention. Thus, usually the hydraulic fluid of the invention contains from about 90% to about 99.5% by weight of phosphinate and about 0.5% to about 10% by weight of the thickener. In preferred practice, a proportion of about 1% to about 5% by weight of thickener is employed in conjunction with about 95% to about 99% by weight of phosphinate. As previously noted, the polyalkyl methacrylate thickener can be employed in smaller amounts as compared to the polyalkylene glycol and polyurethane thickeners, to produce a given effectiveness of hydraulic fluid. Thus, for example, the use of about 2% by weight of the polyalkyl methacrylate, e.g., poly-n-butyl methacrylate, produces approximately the same effect with respect to viscosity improvement as compared to the use of about 5% of the polyalkylene glycol or polyurethane thickener.

The following are examples of hydraulic fluids provided according to the invention:

EXAMPLE 1

*Composition A*

|  | Percent by weight |
|---|---|
| Phenyl di-n-butyl phosphinate | 95 |
| A mixture of 30% by weight of a poly-n-butyl methacrylate having an average molecular weight of 7900, and 70% by weight of an organic phosphate ester as a carrier and solvent, marketed as Acryloid R–3876X by Rohm & Haas Co. | 5 |
|  | 100 |

Composition B

| | Percent by weight |
|---|---|
| Phenyl di-n-butyl phosphinate | 95 |
| A urethane polymer liquid having a viscosity of 4790 centistokes at 210° F. and 85,900 centistokes at 100° F. | 5 |
| | 100 |

Composition C

| | Percent by weight |
|---|---|
| Phenyl di-n-butyl phosphinate | 95 |
| High molecular weight polyalkylene glycol, believed to be an ethylene glycol, isopropylene glycol copolymer having a viscosity of 2,620 centistokes at 210° F. and 19,500 centistokes at 100° F. marketed as Union Carbide Chemical Company's #75–H–90,000 | 5 |
| | 100 |

The viscosity characteristics of Compositions A, B and C of the invention, as compared to phenyl di-n-butyl phosphinate alone as control are set forth in Table I below.

TABLE I

| Composition | Viscosity in Centistokes at— | | | ASTM Viscosity Index |
|---|---|---|---|---|
| | 210° F. | 100° F. | −40° F. | |
| Phenyl di-n-butyl phosphinate alone (control) | 1.99 | 8.96 | 5,000 | −25 |
| A | 3.15 | 13.8 | 16,400 | +98 |
| B | 4.21 | 20.3 | 14,000 | +126 |
| C | 4.22 | 19.4 | (¹) | +141 |

¹ 10,000 to 12,000 and clouded.

From Table I above, it is seen that the incorporation of the invention thickeners into the phenyl di-n-butyl phosphinate base stock, as exemplified by Compositions A, B and C, substantially increased viscosity at 100° F. and at 210° F. of the phenyl di-n-butyl phosphinate, and most significantly substantially increased the viscosity index to operable values for hydraulic fluids for use in aircraft, particularly at high operating temperatures, ranging from about 100 to close to 150. In the case of Compositions B and C, the incorporation of the urethane polymer and the polyalkylene glycol thickeners into the phenyl di-n-butyl phosphinate produced substantially higher viscosity at the low temperature of −40° F. These fluids are still operable at about the above-noted low temperature. However, with Composition A employing the preferred polyalkyl methacrylate as thickener, the viscosity of the resulting fluid Composition A at −40° F. was not significantly greater than the phenyl di-n-butyl phosphinate base stock control itself.

EXAMPLE 2

The following compositions were prepared:

Composition D

| | Percent by weight |
|---|---|
| Phenyl di-n-butyl phosphinate | 94 |
| A mixture of 30% by weight of a poly-n-butyl methacrylate having an average molecular weight of 7,900, and 70% by weight of an organic phosphate ester as a carrier and solvent, marketed as Acryloid R–3876X by Rohm & Haas Co. | 6 |
| | 100 |

The above Composition D, and also a control consisting essentially of phenyl di-n-butyl phosphinate alone, were tested in two types of pumps, one a New York Air Brake Company pump having hydrodynamically lubricated bearings, and the other an American Brake Shoe Company pump, having rolling friction bearings. The pumps were each run continuously with each of the two above-noted compositions at the high operating temperatures noted below until pump failure occurred as result of loss of lubricating properties in the hydraulic fluid being tested.

The respective fluids were tested under severe test conditions in a hydraulic system especially constructed to be substantially identical with the hydraulic power system of an airplane, and including the two above-noted pumps, and were run under extreme conditions of high operating temperature of the order noted below, high pressure and high pumping rate such as are present under take-off conditions involving high power demand on the hydraulic system. Two gallons of each of the hydraulic fluids tested were placed in the reservoir of the system and the system brought up to stable operating conditions at a pump discharge pressure of 3,000 p.s.i. and at the high operating temperatures of 400° F. Simulated hydraulic test systems of this type are described in the tentative ASTM tests of 1963.

Using the phosphinate alone in the system containing the New York Air Brake Company pump, the pump life averaged only five hours, whereas employing Composition D above as hydraulic fluid, the pump life was of the order of about 17 hours. In the system containing the American Brake Shoe Company pump, when employing the phosphinate alone as the hydraulic fluid, the pump life was about 7 hours, whereas employing Composition D, the pump life was about 90 hours.

EXAMPLE 3

Using Composition E below instead of Composition D in the tests of Example 2, similar results are obtainable.

Composition E

| | Percent by weight |
|---|---|
| Phenyl di-n-butyl phosphinate | 98 |
| A poly-n-butyl methacrylate having an average molecular weight of about 8,000 | 2 |
| | 100 |

Example 4

The following are additional examples of hydraulic fluids suitable for use at high operating temperatures above 400° F. according to the invention.

Composition F

| | Percent by weight |
|---|---|
| Phenyl di-n-pentyl phosphinate | 97 |
| A poly-n-hexyl methacrylate having an average molecular weight of about 8,000 to about 10,000 | 3 |
| | 100 |

Composition G

| | Percent by weight |
|---|---|
| Phenyl diisooctyl phosphinate | 96 |
| A polyoctyl methacrylate having an average molecular weight of about 8,000 to about 10,000 | 4 |
| | 100 |

Composition H

| | Percent by weight |
|---|---|
| Naphthyl di-n-butyl phosphinate | 95 |
| A polyethylene glycol polymerized to a material having a viscosity of about 1,400 to about 23,000 centistokes at 100° F. | 5 |
| | 100 |

Composition J

| | Percent by weight |
|---|---|
| Phenyl di-n-hexyl phosphinate | 94 |
| A polypropylene glycol polymerized to a material having a viscosity of about 1,400 to about 23,000 centistokes at 100° F. | 6 |
| | 100 |

Composition K

| | |
|---|---|
| Phenyl diisooctyl phosphinate | 95 |
| A methyl phenyl silicone polymer liquid having a viscosity of about 450 to about 575 centistokes at 100° F. | 5 |
| | 100 |

Composition L

| | |
|---|---|
| Naphthyl di-n-butyl phosphinate | 97 |
| A poly-n-butyl methacrylate having an average molecular weight of about 8,000 | 3 |
| | 100 |

Composition M

Percent by weight

| | |
|---|---|
| Phenyl di-neopentyl phosphinate | 96 |
| A poly-n-butyl methacrylate having an average molecular weight of about 8,000 | 4 |
| | 100 |

Composition N

| | |
|---|---|
| Phenyl di-n-butyl phosphinate | 95 |
| Methyl phenyl silicone polymer marketed as DC 710 by Dow Corning Co. and which is a high molecular weight polymer having a high phenyl to methyl ratio | 5 |
| | 100 |

Composition O

| | |
|---|---|
| Naphthyl dineopentyl phosphinate | 94 |
| A poly-n-butyl methacrylate having an average molecular weight of about 8,000 | 6 |
| | 100 |

From the foregoing, it is seen that the invention provides a novel hydraulic fluid having suitable viscosity characteristics for use at high and low temperatures of operation in modern aircraft systems, and which has outstanding thermal stability and fire resistance at temperatures of about 400 to about 600° F., which are encountered in modern supersonic aircraft operation.

While I have described particular embodiments of my invention for purpose of illustration, it should be understood that various modifications and adaptations thereof may be made within the spirit of the invention, as set forth in the appended claims.

I claim:

1. A composition consisting essentially of an aryl dialkyl phosphinate having the formula

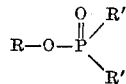

where R is an aryl group selected from the class consisting of phenyl and naphthyl, and R' is an alkyl group containing from 4 to 8 carbon atoms, and from about 0.5% to about 10% by weight of a material selected from the group consisting of polyalkyl methacrylates wherein the alkyl groups contain an average of from about 3 to 10 carbon atoms, and having an average molecular weight in the range from about 7,000 to about 12,000 polyalkylene glycols, wherein the alkylene groups contain from 2 to 3 carbon atoms, and having a range of viscosity of about 1,400 to about 23,000 centistokes at 100° F., urethane polymer liquids, and liquid methyl phenyl silicone polymers having a viscosity in the range of about 450 to about 575 centistokes at 100° F., said material being compatible with said phosphinate and effective to increase the viscosity index to at least 75.

2. A composition as defined in claim 1, wherein said aryl group is phenyl.

3. A composition as defined in claim 1, wherein said aryl group is phenyl and at least one of said alkyl groups is butyl.

4. A composition as defined in claim 1, wherein said aryl dialkyl phosphinate is phenyl di-n-butyl phosphinate.

5. A composition as defined in claim 1, wherein R is phenyl and said material is said polyalkyl methacrylate.

6. A composition as defined in claim 1, wherein R is phenyl and said material is poly-n-butyl methacrylate.

7. A fire-resistant hydraulic fluid consisting essentially of phenyl di-n-butyl phosphinate having the formula

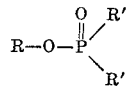

where R is phenyl and R' is n-butyl, and from about 0.5% to about 10% by weight of a polyalkyl methacrylate wherein the alkyl groups contain an average of from about 3 to about 10 carbon atoms and having an average molecular weight in the range from about 7,000 to about 12,000.

8. A fire-resistant hydraulic fluid consisting essentially of phenyl di-n-butyl phosphinate having the formula

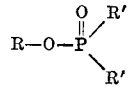

where R is phenyl and R' is n-butyl, and from about 1% to about 5% by weight of poly-n-butyl methacrylate having an average molecular weight of about 7,000 to about 12,000.

References Cited

UNITED STATES PATENTS

| 2,174,019 | 9/1939 | Sullivan | 252—78 X |
| 2,636,862 | 4/1953 | Watson | 252—78 |
| 2,947,699 | 8/1960 | Wasson et al. | 252—76 |

LEON D. ROSDOL, *Primary Examiner.*

STANLEY D. SCHWARTZ, RICHARD D. LOVERING,
*Assistant Examiners.*